(12) United States Patent
Kirsch et al.

(10) Patent No.: US 10,620,451 B1
(45) Date of Patent: Apr. 14, 2020

(54) EYEGLASSES WITH REMOVABLE LENS

(71) Applicants: Nancy T. Kirsch, Brooklyn, NY (US); Arlene Jurist, Syosset, NY (US)

(72) Inventors: Nancy T. Kirsch, Brooklyn, NY (US); Arlene Jurist, Syosset, NY (US)

( * ) Notice: Subject to any disclaimer, the term of this patent is extended or adjusted under 35 U.S.C. 154(b) by 44 days.

(21) Appl. No.: 15/980,126

(22) Filed: May 15, 2018

(51) Int. Cl.
*G02C 1/04* (2006.01)

(52) U.S. Cl.
CPC ........... *G02C 1/04* (2013.01); *G02C 2200/02* (2013.01); *G02C 2200/08* (2013.01)

(58) Field of Classification Search
CPC ... G02C 2200/02; G02C 2200/06; G02C 7/16
USPC .................................................. 351/86, 106
See application file for complete search history.

(56) References Cited

U.S. PATENT DOCUMENTS

| | | | |
|---|---|---|---|
| 3,838,914 A * | 10/1974 | Fernandez | G02C 1/04 351/106 |
| 4,196,981 A | 4/1980 | Waldrop | |
| 5,416,537 A | 5/1995 | Sadler | |
| 5,936,700 A | 8/1999 | Masunaga | |
| 6,027,214 A | 2/2000 | Graham | |
| 6,478,420 B2 | 11/2002 | Xiang | |
| 6,592,220 B1 * | 7/2003 | Cheong | G02C 1/04 351/103 |
| 6,616,274 B1 | 9/2003 | Sabia et al. | |
| 7,452,069 B2 | 11/2008 | Lipawsky | |
| 7,594,280 B2 | 9/2009 | Lindahl | |
| 7,600,870 B2 | 10/2009 | Zelazowski | |
| 7,661,815 B2 | 2/2010 | Lipawsky | |
| 7,850,301 B2 * | 12/2010 | DiChiara | G02C 1/04 351/106 |
| 8,371,905 B1 | 2/2013 | Rosillo et al. | |
| 8,641,188 B2 | 2/2014 | DiChiara | |
| 8,905,539 B2 | 12/2014 | Chen | |
| 9,341,865 B2 | 5/2016 | Sheldon et al. | |
| 2002/0089639 A1 | 7/2002 | Starner et al. | |
| 2005/0001976 A1 | 1/2005 | Yinkai et al. | |
| 2005/0206836 A1 | 9/2005 | Shapiro | |
| 2010/0060846 A1 | 3/2010 | Zelazowski | |
| 2013/0185849 A1 | 7/2013 | Laughlin et al. | |

* cited by examiner

*Primary Examiner* — Hung X Dang

(74) *Attorney, Agent, or Firm* — Cramer Patent & Design, PLLC; Aaron R. Cramer

(57) ABSTRACT

An eyeglass frame each has a plurality of first magnets located at each eye section and a pair of lens, each having a plurality of second magnets, able to be removably connected to the first magnets. This provides a way to removably attach an individual lens to a corresponding eye section of the frame.

9 Claims, 3 Drawing Sheets

EYEGLASSES WITH REMOVABLE LENS

RELATED APPLICATIONS

Not applicable

FIELD OF THE INVENTION

The present invention relates generally to the field of eyewear and more particularly, to eyewear frames having individually detachable lens.

BACKGROUND OF THE INVENTION

Glasses, also known as eyeglasses or spectacles, are devices consisting of lenses mounted in a frame which holds them in front of a person's eyes. One (1) common use for glasses is for vision correction. Also, safety glasses provide eye protection against flying debris or against visible and near-visible light or radiation. Further, sunglasses allow better vision in bright daylight, and may protect one's eyes against damage from high levels of ultraviolet light. Specialized glasses may be used for viewing specific visual information (such as stereoscopy). Sometimes glasses are worn simply for aesthetic or fashion purposes. The number of Americans who are nearsighted has doubled since the 1970's and almost three-quarters (¾) of the US population now wears glasses. People are more likely to need glasses the older they get with ninety-three percent (93%) of people between the age of sixty-five to seventy-five (65-75) wearing corrective lenses. Typically, a user must fully remove his or her glasses to put drops in the eyes, remove debris, or apply/remove makeup. Therefore, a suitable solution is desired.

Various attempts have been made to solve problems found in eyeglass art. Among these are found in: U.S. Pat. App. Pub. Nos. 2014/0268030, U.S. Pat. Nos. 4,209,234, 3,838,913, 3,252,747 and 3,238,005. These prior art references are representative of eyeglasses.

None of the above inventions and patents, taken either singly or in combination, is seen to describe the invention as claimed. Thus, a need exists for a reliable pair of glasses, specifically multifunctional reading eyeglasses, and to avoid the above-mentioned problems.

SUMMARY OF THE INVENTION

In view of the foregoing references, the inventor recognized the aforementioned inherent problems and observed that there is a need for an implement which allows a user to individually removably attach a lens to an eyeglass frame.

To achieve the above objectives, it is an object of the present invention to comprise such an eyeglass frame having a first rim and a second rim attached to each via a bridge. A first earpiece is hingedly attached to the first rim opposite the bridge. Similarly, a second earpiece is hingedly attached to the second rim opposite the bridge. In certain embodiments, the earpieces, rims, and bridge are a unitary structure.

Another object of the present invention is to comprise the first rim and the second rim to each have at least one (1) first magnet embedded therein. It is preferred that the first magnets are located within the respective rim adjacent the lower edge thereof. A first lens and a second lens each have at least one (1) second magnet that is capable of magnetic attraction to the first magnets in the eyeglass frame. The second magnets of the first lens are removably attachable to the first magnets of the first rim. Similarly, the second magnets of the second lens are removably attachable to the first magnets of the second rim. It is preferred that the second magnets are located adjacent an upper edge of a respective lens.

Yet still another object of the present invention is to provide multiple embodiments on how the second magnets are affixed to the respective lens. In a first embodiment, the second magnets are placed within a bore of a first surface of the lens. The second magnets can be secured within the bore by friction fit or with a potting compound. In a second embodiment, the second magnets are adhesively bonded to the first surface of the respective lens. In a third embodiment, the second magnets are disposed within an aperture passing through the respective lens. The second magnets can be secured within the aperture by a friction fit or with a potting compound.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
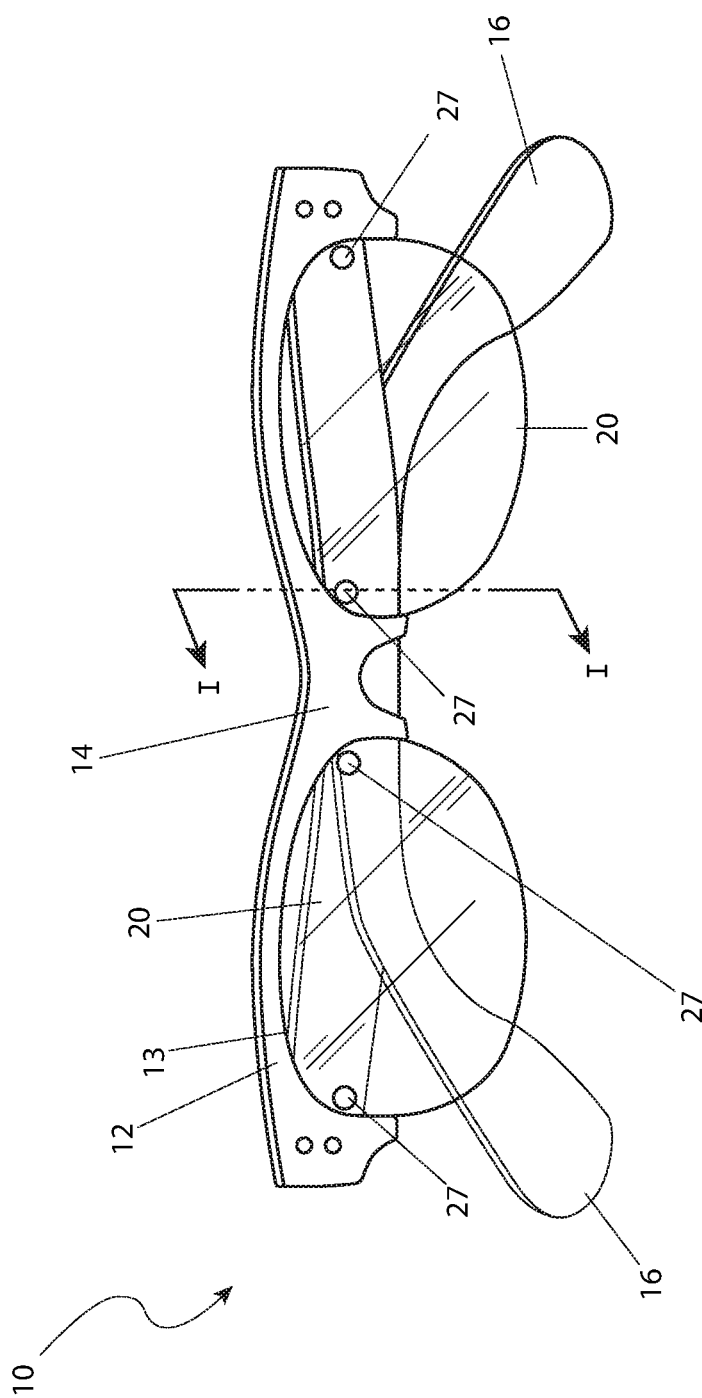
FIG. 1 is a front view of a pair of eyeglasses 10, according to an embodiment of the present invention.

DESCRIPTIVE KEY 10 eyeglasses
12 frame
13 rim
14 bridge
15 hinge
16 earpiece
17 first magnet
20 lens
22 bore
23 aperture
25 potting compound
27 second magnet

DETAILED DESCRIPTION OF THE PREFERRED EMBODIMENT

The present invention is directed to a pair of eyeglasses 10. In one (1) embodiment of the present invention, the eyeglasses 10 may comprise fashionable reading eyeglasses 10 containing a pair of individual eyeglass lenses 20 which are held place and each independently removable and detachable to a frame 12 via a magnetic fastening means where a plurality of first magnets 17 residing within the frame 12 is magnetically attracted to a plurality of second magnets 27 residing in each one (12) of the lens 20. It is appreciated that the frame 23 of the eyeglasses 10 may be provided with any size and shape and manufactured out of any suitable synthetic material, such as metals or plastics, or natural material, such as stone, bone, or wood. Further, the frame 12 can be provided as a chassis where the bridge 14 and rims 13 are unitary or not. Some embodiments of the eyeglasses 10 may also provide where the earpieces 16, rims 13, and bridge 14 are a unitary structure.

The bridge portion 14 of the frame 12 is structured and arranged to sit comfortably upon the nose of the user, with each of earpieces 16 sitting upon an ear of the user, and the rims 13 residing above each eye of a user. Accordingly, the frame 12 may be provided as a customized fit to an individual user. In some embodiments, the earpieces 16, rim 13, and bridge 14 may include soft, padded material to add additional comfort to the user during use. Also, the bridge 14 may comprise nose pads. In all embodiments, it is appreciated that neither does a lower part of the rim, nor does an eye wire, exist in the present invention; both features aid in supporting and securing the lends 20 in traditional eyeglasses 10.

Referring now to FIG. 1, the pair of eyeglasses 10 may comprise a frame 12 and two (2) lenses 20. The frame 12 may comprise two (2) earpieces 16, two (2) rims 13, and a bridge 14. The earpieces 16 may be attached to the respective rim 13 with a hinge 15 such that the earpieces 16 may be rotated outward into a ready-to-wear condition and, alternately, rotated inward such that the pair of eyeglasses 10 is in a compact, ready to store condition.

Figure 2:
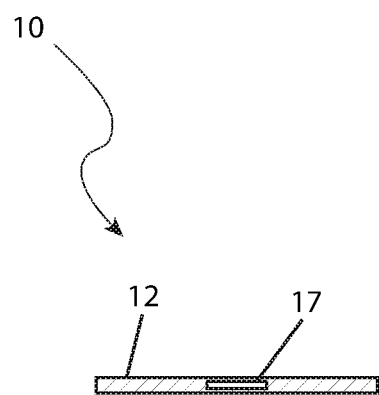
FIG. 2 is a cross-sectional view of a pair of eyeglasses 10, according to an embodiment of the present invention.

Referring now to FIGS. 2a and 2b, the frame 12 further comprises a plurality of first magnets 17, as illustrated here in cross-sectional views of the rim portion 13 of the frame 12 of FIG. 1. In a preferred embodiment, the first magnets 17 are located within the rim 13 and adjacent an inner lower side thereof, one (1) location at the outer portion of the rim 13 adjacent the hinge 15 and earpiece 16 and one (1) location adjacent the bridge 14. As such, there are preferred two (2) first magnets 17 for each lens 20 and four (4) total first magnets 17. It is appreciated that the first magnets 17 reside wholly within the rims 13 and are not visible from the outside. Certain embodiments are provided where the first magnets 17 are at least partially visible from the inside (i.e. the side facing the user when the eyeglasses 10 are worn).

Figure 3:
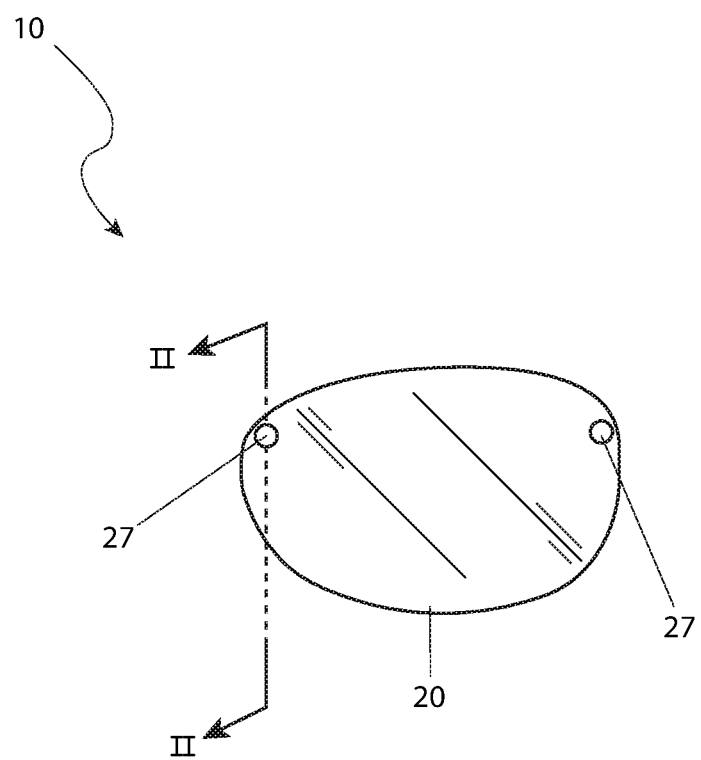
FIG. 3 is a front view of a single lens 20, according to an embodiment of the present invention.

Referring now to FIG. 3, there is illustrated an individual lens 20. It is appreciated that the lens 20 may be any shape, size, or material of construction so as to match the individual taste of the user or construction of the manufacturer. The lens 20 may be individually shaped to account for a right side of the frame 12 or a left side of the frame 12. In this embodiment, the eyeglasses 10 may be paired with a right-sided lens 20 and a left-sided lens 20. It is also appreciated that the shape of the lens 20 could also be identical, where a single lens 20 can be utilized for either the right side of the frame 12 or the left side of the frame 12. It is further appreciated that the shape of the upper portion of the lens 20 generally corresponds to the shape of the lower portion of the rim 13, whatever they may be.

Referring now to FIGS. 4a-4d, illustrations of multiple embodiments of the location of the second magnets 27 with the lens 20, is herein described. Accordingly, each lens 20 has a plurality of second magnets 27, each located adjacent opposing upper perimeter edges thereof and further described below. It is preferred that the number of second magnets 27 residing in the lens 20 matches the number of first magnets 17 residing in a corresponding half of the frame 12. As an example, if the frame 12 has two (2) first magnets 17 located on the left side and two (2) first magnets 17 located on the right side, then one (1) of the lens 20 corresponding to the left side will have two (2) second magnets 27 and the other lens 20 corresponding to the right side would have two (2) second magnets 27. The first magnets 17 and second magnets 27 are structured and arranged such that the lens 20 may be easily removed from the frame 12 by a user by defeating the magnetic bond between the first magnets 17 and second magnets 27.

The magnetic attraction between the first and second magnets 17, 27 is such that each lens 20 may be removed by holding the lens 20 at its edge and simply detaching it from the frame 12. Once a lens 20 is detached, the wearer may have full access to each eye, with the absence of the lens 20, for the purpose of performing a desired optical-related task. Similarly, the lens 20 may be reattached by placing the second magnets 27 adjacent to the first magnets 17. Tasks that may be easily and readily performed by the wearer of the pair of eyeglasses 10 may be applying makeup, insertion of contact lens, or the installation of ocular medicine in the form of drops. The pair of eyeglasses 10 may be available in a fashionable design.

Figure 4A:
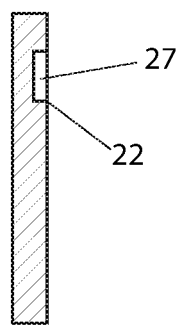
FIG. 4a is a cross-sectional view of a single lens 20 along the line III-III in FIG. 3, according to a preferred embodiment of the present invention.

FIG. 4a illustrates a first embodiment of the second magnet 27 and lens 20 arrangement. In this embodiment, a plurality of bores 22, matching the number of desired second magnets 27, is formed within a first surface of the lens 20. The first surface is envisioned to be on the side that would face the user when the lens 20 is attached to the frame 12. Each second magnet 27 resides within an individual bore 22 and is secured therein with a press-fit or frictional connection. As such, an individual second magnet 27 is sized and shaped to match the geometry of the bore 22 (i.e., if the bore 22 has a circular cross-section, then the second magnet 27 is circular). It is preferred that the bore 25 is formed such that the outer surface of the second magnet 27 is flush with the surface of the lens 20 when the second magnet 27 is secured therein.

Figure 4B:
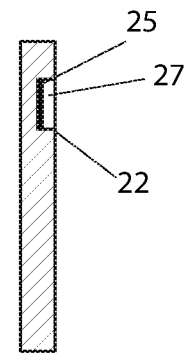
FIG. 4b is a cross-sectional view of a single lens 20 along the line III-III in FIG. 3, according to another embodiment of the present invention.

FIG. 4b illustrates a second embodiment of the second magnet 27 and lens 20 arrangement. In this embodiment, a plurality of bores 22, matching the number of desired second magnets 27, is formed within a first surface of the lens 20. The first surface is envisioned to be on the side that would face the user when the lens 20 is attached to the frame 12. Each second magnet 27 resides within an individual bore 22 and is secured therein with a potting compound 25. As such, an individual second magnet 27 is sized and shaped to match the geometry of the bore 22 (i.e., if the bore 22 has a circular cross-section, then the second magnet 27 is circular). It is preferred that the bore 25 is formed such that the outer surface of the second magnet 27 is flush with the surface of the lens 20 when the second magnet 27 is secured therein with the potting compound 25.

Figure 4C:
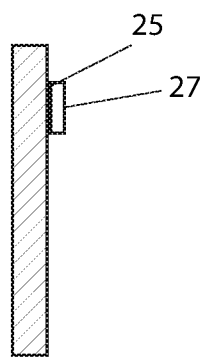
FIG. 4c is cross-sectional view of a single lens 20 along the line in FIG. 3, according to yet another embodiment of the present invention; and, FIG. 4d is a cross-sectional view of a single lens 20 along the line III-III in FIG. 3, according to yet still another embodiment of the present invention.

FIG. 4c illustrates a third embodiment of the second magnet 27 and lens 20 arrangement. In this embodiment, each second magnet 27 is secured to a first surface of the lens 20 with a bonding means, such as an adhesive or potting compound 25. The first surface is envisioned to be on the side that would face the user when the lens 20 is attached to the frame 12. In this embodiment, the second magnet 27 extends away minimally from the first surface of the lens 20.

Figure 4D:
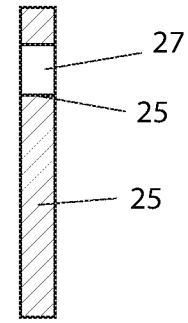

FIG. 4d illustrates a fourth embodiment of the second magnet 27 and lens 20 arrangement. In this embodiment, a plurality of apertures 23, matching the number of desired second magnets 27, is formed within through the lens 20. Each second magnet 27 resides within an individual aperture 23 and may or may not be secured therein with a potting compound 25. As such, an individual second magnet 27 is sized and shaped to match the geometry of the aperture 23 (i.e., if the aperture 23 has a circular cross-section, then the second magnet 27 is circular). It is preferred that the outer surface of the second magnet 27 is flush with the surface of the lens 20 when the second magnet 27 is secured therein, with or without the potting compound 25.

In some embodiments, the pair of eyeglasses 10 may be manufactured in various colors and materials according to user preferences. Similarly, materials for construction of the pair of eyeglasses 10 may be selected dependent upon types of use (e.g., lenses 20 may be shatter-proof, the frame 12 may be corrosion-resistant, constructed of non-metallic materials, etc.).

The exact specifications, materials used, and method of use of the pair of eyeglasses 10 may vary upon manufacturing.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. An eyeglass device, comprising:
a frame, comprising:
a first rim having a first earpiece hingedly attached to a first side thereof;
a second rim having a second earpiece hingedly attached to a first side thereof;
a bridge conjoining a second side of a first eye section to a second side of said second eye section with at least one first side magnet, each said at least one first side magnet disposed within said first rim;
at least one second side magnet each disposed within said second rim;
a first lens having at least one first lens magnet affixed within an individual first bore, each said at least one first lens magnet magnetically attachable to an individual first side magnet; and
a second lens having at least one second lens magnet affixed within an individual second bore, each said at least one second lens magnet magnetically attachable to an individual second side magnet;
wherein each said first side magnet is embedded within said first rim adjacent a lower edge thereof;
wherein each said second side magnet is embedded within said second rim adjacent a lower edge thereof;
wherein each said first lens magnet is embedded within said first lens adjacent an upper edge thereof;
wherein each said second lens magnet is embedded within said second lens adjacent an upper edge thereof;
wherein each said first lens magnet is secured within said individual first bore with a potting compound; and
wherein each said second lens magnet is secured within said individual second bore with said potting compound.

2. The device of claim 1, wherein said frame is a unitary structure.

3. The device of claim 1, further comprising:
two said first side magnets each located on opposing sides of said first rim lower edge;
two said second side magnets each located on opposing sides of said second rim lower edge;
two said first lens magnets each located on opposing sides of said first lens upper edge; and
two said second lens magnets each located on opposing sides of said second lens upper edge.

4. An eyeglass device, comprising:
a frame, comprising:
a first rim having a first earpiece hingedly attached to a first side thereof;
a second rim having a second earpiece hingedly attached to a first side thereof;
a bridge conjoining a second side of a first eye section to a second side of said second eye section with at least one first side magnet, each said at least one first side magnet disposed within said first rim;
at least one second side magnet each disposed within said second rim;
a first lens having at least one first lens magnet bonded to a first surface thereof, each said at least one first lens magnet magnetically attachable to an individual first side magnet; and
a second lens having at least one second lens magnet bonded to a first surface thereof, each said at least one second lens magnet magnetically attachable to an individual second side magnet;
wherein each said first side magnet is embedded within said first rim adjacent a lower edge thereof and each said second side magnet is embedded within said second rim adjacent a lower edge thereof;
wherein each said first lens magnet is located adjacent an upper edge thereof and each second lens magnet is located adjacent an upper edge thereof; and
wherein each said first lens magnet is bonded to said first lens first surface with a potting compound and each said second lens magnet is bonded to said second lens first surface with said potting compound.

5. The device of claim 4, wherein said frame is a unitary structure.

6. The device of claim 4, further comprising:
two said first side magnets each located on opposing sides of said first rim lower edge;
two said second side magnets each located on opposing sides of said second rim lower edge;
two said first lens magnets each located on opposing sides of said first lens upper edge; and
two said second lens magnets each located on opposing sides of said second lens upper edge.

7. An eyeglass device, comprising:
a frame, comprising:
a first rim having a first earpiece hingedly attached to a first side thereof;
a second rim having a second earpiece hingedly attached to a first side thereof;
a bridge conjoining a second side of a first eye section to a second side of said second eye section with at least one first side magnet, each said at least one first side magnet disposed within said first rim; and
a first lens having at least one first lens magnet affixed within an individual first aperture, each said at least one first lens magnet magnetically attachable to an individual first side magnet; and
a second lens having at least one second lens magnet affixed within an individual second aperture, each said at least one second lens magnet magnetically attachable to an individual second side magnet;

wherein each first side magnet is embedded within said first rim adjacent a lower edge thereof and each second side magnet is embedded within said second rim adjacent a lower edge thereof;

wherein each said first lens magnet is embedded within said first lens adjacent an upper edge thereof and each said second lens magnet is embedded within said second lens adjacent an upper edge thereof; and wherein each said first lens magnet is secured within said individual first aperture with a potting compound and each second lens magnet is secured within said individual second aperture with said potting compound.

8. The device of claim 7, wherein said frame is a unitary structure.

9. The device of claim 7, further comprising:

two said first side magnets each located on opposing sides of said first rim lower edge;

two said second side magnets each located on opposing sides of said second rim lower edge;

two said first lens magnets each located on opposing sides of said first lens upper edge; and two said second lens magnets each located on opposing sides of said second lens upper edge.

\* \* \* \* \*